United States Patent
Du

(10) Patent No.: US 8,457,640 B2
(45) Date of Patent: Jun. 4, 2013

(54) HANDOFF ACCESS METHOD AND DEVICE BASED ON RANDOM ACCESS CHANNEL

(75) Inventor: Zhongda Du, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 523 days.

(21) Appl. No.: 12/442,842

(22) PCT Filed: Sep. 20, 2007

(86) PCT No.: PCT/CN2007/002778
§ 371 (c)(1),
(2), (4) Date: May 15, 2009

(87) PCT Pub. No.: WO2008/040176
PCT Pub. Date: Apr. 10, 2008

(65) Prior Publication Data
US 2010/0009684 A1  Jan. 14, 2010

(30) Foreign Application Priority Data
Sep. 29, 2006  (CN) .......................... 2006 1 0152438

(51) Int. Cl.
*H04W 36/00* (2009.01)
(52) U.S. Cl.
USPC ........... 455/439; 455/436; 455/442; 455/451; 370/329; 370/331; 370/335
(58) Field of Classification Search
USPC ............................ 455/436–453; 370/328–336
See application file for complete search history.

(56) References Cited

U.S. PATENT DOCUMENTS

| 7,433,334 | B2 * | 10/2008 | Marjelund et al. | 370/329 |
| 7,809,373 | B2 * | 10/2010 | Park et al. | 455/436 |
| 7,881,724 | B2 * | 2/2011 | Park et al. | 455/452.2 |
| 2003/0139170 | A1 * | 7/2003 | Heo | 455/410 |
| 2007/0047493 | A1 * | 3/2007 | Park et al. | 370/331 |
| 2007/0147310 | A1 * | 6/2007 | Cai | 370/335 |
| 2007/0293224 | A1 * | 12/2007 | Wang et al. | 455/436 |
| 2009/0011769 | A1 * | 1/2009 | Park et al. | 455/450 |
| 2009/0325579 | A1 * | 12/2009 | Kishiyama et al. | 455/436 |
| 2010/0227617 | A1 * | 9/2010 | Jung et al. | 455/438 |
| 2010/0278143 | A1 * | 11/2010 | Chun et al. | 370/331 |
| 2012/0077512 | A1 * | 3/2012 | Park et al. | 455/452.1 |

FOREIGN PATENT DOCUMENTS

| CN | 1389995 A | 1/2003 |
| CN | 1596020 A | 3/2005 |
| WO | 0032000 A1 | 6/2000 |
| WO | 0172080 A1 | 9/2001 |
| WO | 2006012795 A1 | 2/2006 |

* cited by examiner

*Primary Examiner* — Lester Kincaid
*Assistant Examiner* — Mehmood B Khan
(74) *Attorney, Agent, or Firm* — Bright IP Law Offices

(57) ABSTRACT

A handoff access method and device based on a random access channel is provided, the method includes the following steps: step a, a source BS sends a handoff request message to a target BS, requesting switching the mobile terminal it serves to the target BS; step b, the target BS sends a handoff response message to the source BS, and then the source BS forwards a handoff command with its content to the mobile terminal, wherein the handoff command message does not include reserved character codes; step c, after receiving the handoff command message, the mobile terminal determines that the handoff command message does not include the reserved character codes, and then selects a random access sub-channel; and step d, the target BS and the mobile terminal initiate a random access procedure on the random access sub-channel.

19 Claims, 6 Drawing Sheets

HANDOFF ACCESS METHOD AND DEVICE BASED ON RANDOM ACCESS CHANNEL

FILED OF THE INVENTION

The present invention relates to communication field, in particular to a handoff access method and device based on a random access channel.

BACKGROUND OF THE INVENTION

As shown in FIG. 1, a cellular wireless communication system is mainly composed of a mobile terminal, a wireless access network, and a core network.

For the cellular wireless communication system, the mobile terminal needs to send a random access message via uplink common channel before communicating with the network. Such a common channel is referred to as random access channel. The main purpose of random access is to occupy limited wireless channel resources in a competitive manner, and/or to obtain uplink synchronous information. The uplink synchronous information is utilized by the mobile terminal to determine when to send uplink signal, so that the uplink signal falls into the signal reception time window of a base station (BS) receiver.

The channels of the cellular wireless communication system can be distinguished by all possible technologies, such as code division, frequency division, and time division, and the minimum unit in time domain of each channel is a frame. The frame or frame combination for random access is a random access time slot, and the random access time slots of the same channel compose a random access sub-channel in a certain way. In FIG. 2, 3 frequency carriers (FCs) and 3 channel codes (CCs) compose 9 channels, for example, the FC 2 and the CC 2 compose a channel, and one of every 6 frames on this channel is utilized as a random access time slot which form a random access sub-channel on this channel, and the spacing between two random access time slots are 5 frames. The channel composed of FC 1 and CC 1 is also configured with a random access sub-channel, and thus there are 2 random access sub-channels in this cell.

The message per se employs a very low data rate in order to ensure an effective coverage of an initial random access message, in other words, the message has limited information bits. For instance, in the LTE (Long Term Evolution) system of currently discussed 3GPP (3rd Generation Partnership Project), a random time slot composed of non-synchronous single frames (duration: 1 ms) can carry information not more than 10 bits.

Generally, the information bits of a random access message are represented by sequence number of character codes with high self-correlation. During one random access time slot, the wireless access network can distinguish random access messages containing various character codes, and thus a collision occurs only when two random access messages with an identical character code are received during a same random access time slot. The collision will result in that the wireless access network can not distinguish the individual terminals, that is to say, in the view of the wireless access network, the effect is the same as that only access request from one terminal is received. In this circumstance, an additional collision resolution mechanism between the terminals and the wireless access network is required to ensure that one of the terminals can access successfully, while the failed ones will access to the wireless network in such competitive manner again. Sometimes, a collision can result in failure in the access of all terminals involved in the collision.

The initial access starting from a free state (idle state) is one reason for random access, and one more important reason is the handoff access between BSs.

During the communication between a terminal and a network, when the terminal moves among different cells, the wireless channel needs to be switched to keep the communication. When a target cell and a source cell belong to different BSs, one possible handoff manner is that a target BS has provided wireless channel resources during the handoff preparation stage, and then informs the terminal to access to the wireless channel allocated by the target BS via a source BS. This handoff manner is very effective for systems based on dedicated wireless channel resource, such as GSM (Global System for Mobile Communication), but it will increase the system complexity and thus result in a low utilization ratio of the wireless channel resource for wireless communication systems based on shared channel, such as LTE, this is because the resource BS needs to know the time difference between the source BS and the target BS at the beginning of the handoff so as to inform the terminal of a proper time to access to the target BS. However, it is very difficult to obtain a precise time difference, and therefore the wireless access network needs to employ a complex mechanism to acquire the time difference. Besides, because the transmission time of a message in the wireless access network or wireless interface is uncertain, it is very difficult for the target BS to reserve shared wireless channel resources, a too early reservation will lower the utilization efficiency of the wireless channel, and a too late reservation will result in missing access time of the terminal or introducing an additional delay, and therefore some redundant wireless channel resources will be reserved to ensure successful handoff, which will lower the utilization efficiency of the wireless resources. So generally, a handoff manner without reserving wireless channel resources will be employed, that is to say, the terminals acquire wireless channel resources at the target BS in a competitive random access manner. With the technological development of cellular wireless communication system, the time for such random access procedure is very short, for example, it takes about 20 ms in the LTE system.

When a terminal being in communication moves among cells, means such as handoff need to be employed to keep the communication continuity. Generally, channels except common channels employ channel share mechanism, and the uplink and downlink wireless resources are scheduled by wireless access network.

The delay for a terminal in accessing to wireless access network via random access is very important to either access reason. However, the delay of handoff access, i.e. the delay due to handoff interruption is subject to a stricter requirement by the cellular wireless communication system. When a terminal moves among cells, the most primary and direct reason for handoff is that the signal strength of the original cell has decreased to such a dangerous extent that the communication quality of the terminal will be deteriorated, even phenomena such as call drop and interruption will occur, if the wireless channel is not switched to a cell with better signal quality. For a terminal, there is obvious difference between the introduction in free state or inactive state and the introduction in service active state for a same delay, and the terminal is more sensitive to the latter. During a random access procedure, the delay is mostly incurred from the above said "collision", because the collision will result in that only one terminal can access to the wireless network, or even all terminals fail in the access, and even if the failed ones can re-access successfully, that will result in more delay. It is necessary to provide a method to eliminate the collision probability during the handoff access procedure of a terminal based on the importance of handoff access.

Eliminating the collision probability during handoff access can be realized by reserving dedicated random access character codes. However, in some peculiar circumstances, for example, there are not enough reserved character codes, the target BS will not be able to allocate reserved character codes, thus leading to handoff failure.

Thus, there is a need for a handoff access solution for cellular wireless communication system to solve above mentioned problems.

SUMMARY OF THE INVENTION

The present invention is directed to provide a handoff access method and device based on random access channel to solve the handoff access problem in the prior art that no reserved character code is allocated under the precondition that the network reserves part of character codes.

According to one aspect of the present invention, a handoff access method based on a random access channel is provided, for handoff access of a mobile terminal in a cellular mobile communication system, and comprises the following steps: Step a, sending a handoff request message to a target BS by a source BS, the handoff request message is used to request switching a mobile terminal that the source BS serves to the target BS; Step b, sending a handoff response message to the source BS by the target BS, then forwarding a handoff command with the content of the handoff response message to the mobile terminal by the source BS, wherein the handoff command message does not include reserved character code, and the reserved character code is a part of random access character codes separately allocated to the handoff access mobile terminal; Step c, after receiving the handoff command message by the mobile terminal, determining the handoff command message does not include the reserved character code, and then selecting a random access sub-channel; and Step d, initiating a handoff access procedure on the random access sub-channel by the target BS and the mobile terminal.

Preferably, the Step b further comprises the following step: the target BS does not contain the reserved character code in the handoff response message if there are no free reserved character codes.

Preferably, the Step b further comprises the following step: the target BS does not contain the reserved character code in the handoff response message if the mobile terminal is out of uplink synchronization before handoff.

Preferably, the step c further comprises the following step: selecting a random access sub-channel having no reserved character code by the mobile terminal.

Preferably, the step c further comprises the following step: if the selected random access sub-channel has reserved the reserved character code, then selecting a non-reserved character code and selecting the random access sub-channel that the non-reserved character code is located in by the mobile terminal, wherein the non-reserved character code is a residual random access character code.

Preferably, information of the non-reserved character code is obtained from a system message; or, information of the non-reserved character code is obtained from the handoff command message.

Preferably, step d further comprises the following step: sending a random access response message to the mobile terminal by the target BS, wherein the message contains uplink synchronous information and uplink wireless channel resource information; and after receiving the random access response message, sending a handoff complete message to the target BS by the mobile terminal.

Preferably, the step b further comprises the following step: containing by the target BS in the handoff command message a temporary ID number allocated by the target BS to the mobile terminal, wherein the handoff complete message includes the temporary ID number for further collision resolution mechanism.

According to another aspect of the present invention, a handoff access device based on a random access channel is provided, for the handoff access of a mobile terminal in a cellular mobile communication system, comprises: a handoff request module, used to make a source BS send a handoff request message to a target BS to request switching a mobile terminal that the source BS serves to the target BS; a handoff response module, used to make the target BS send a handoff response message to the source BS, and the source BS transmit the content of the handoff response message contained in a handoff command message to the mobile terminal, wherein the handoff command message does not include reserved character code, and the reserved character code is a part of the random access character codes separately allocated to the handoff access mobile terminal; a sub-channel selecting module, used to make the mobile terminal determine that the handoff command message does not include the reserved character code and then select a random access sub-channel after the handoff command message is received; and a handoff access module, used to make the target BS and the mobile terminal initiate a handoff access procedure on the random access sub-channel.

Other characteristics and advantages of the present invention will be described in the following specification, and will be apparent partly from the specification and embodiments of the present invention. The objects and other advantages can be realized and obtained through the structure of the specification, claims, and the drawings.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein.

DETAILED DESCRIPTION

The present invention will be detailed hereinafter in connection with the embodiments of the present invention and reference will be made to the drawings. If not conflict, the embodiments and the technical features thereof can be combined each other.

The present invention provides a handoff access method and device based on random access channel.

Figure 7:
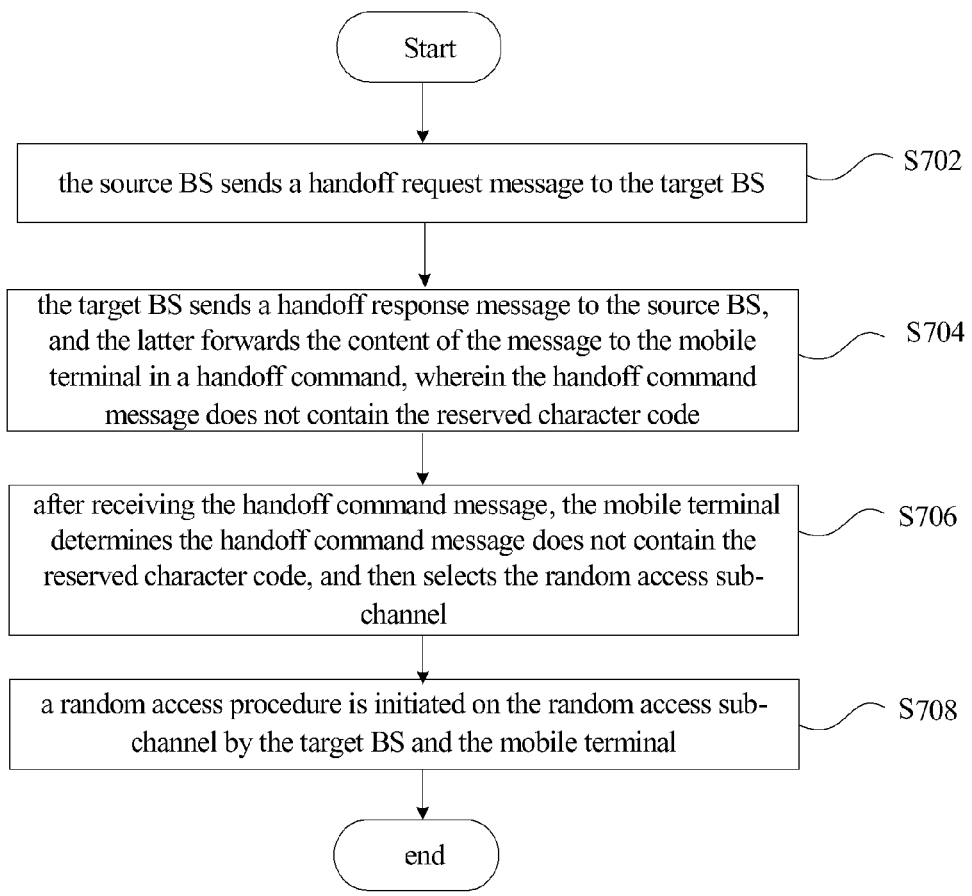
FIG. 7 is a flowchart of the handoff access method based on random access channel according to the embodiments of the present invention.

FIG. 7 is a flowchart of the handoff access method based on random access channel according to the embodiment of the present invention, and the procedure comprises the following steps:

Step 702, a source BS sends a handoff request message to a target BS, requests switching a mobile terminal that the source BS serves to the target BS;

Step 704, the target BS sends a handoff response message to the source BS, and the latter forwards the content of the handoff response message to the mobile terminal in a handoff command message, wherein the handoff command message does not include reserved character code, and the reserved character code is a part of the random access character codes separately allocated to the handoff access mobile terminal;

Step 706, after receiving the handoff command message, the mobile terminal determines the handoff command message does not include the reserved character code, and then selects a random access sub-channel; and Step 708, a handoff access procedure is initiated on the random access sub-channel by the target BS and the mobile terminal.

Alternatively, Step 704 comprises the following step: the target BS does not contain the reserved character code in the handoff response message if there are no free reserved character codes.

Alternatively, Step 704 comprises the following step: the target BS does not contain the reserved character code in the handoff response message if the mobile terminal is out of uplink synchronization before handoff.

Alternatively, Step 706 comprises the following step: the mobile terminal selects a random access sub-channel having no reserved character code.

Alternatively, Step 706 comprises the following step: if the selected random access sub-channel has reserved the reserved character code, the mobile terminal selects a non-reserved character code and then selects the random access sub-channel that the non-reserved character code is located in, wherein the non-reserved character code is a residual random access character code.

Alternatively, information of the non-reserved character code is obtained from system message.

Alternatively, information of the non-reserved character code is obtained from the handoff command message.

Alternatively, Step 708 comprises the following step: the target BS sending a random access response message to the mobile terminal, wherein the message contains uplink synchronous information and uplink wireless channel resource information; and after receiving the random access response message, the mobile terminal sends a handoff complete message to the target BS.

Alternatively, Step 704 further comprises the following step: the target BS contains in the handoff command message a temporary ID number allocated to the mobile terminal, wherein the handoff complete message includes the temporary ID number for further collision resolution mechanism.

Figure 8:
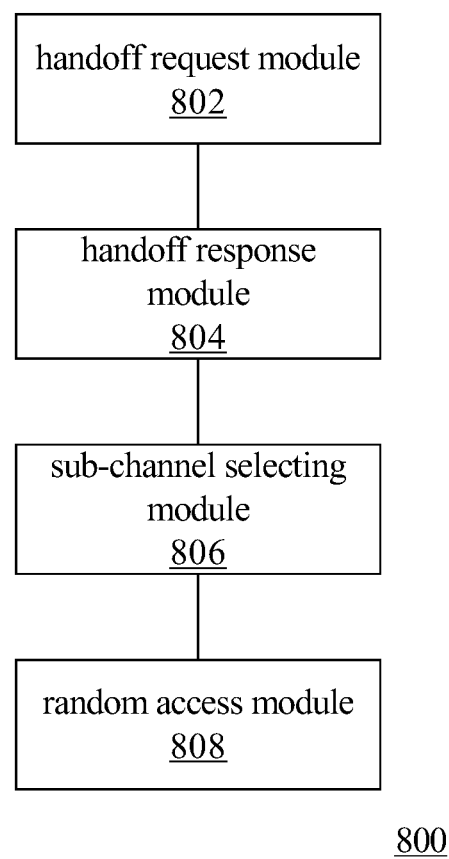
FIG. 8 is a block diagram of the handoff access device based on random access channel according to the embodiments of the present invention.

FIG. 8 is a block diagram of the handoff access device 800 based on random access channel according to embodiments of the present invention. The handoff access device 800 comprises:

A handoff request module 802, used to make the source BS send the handoff request message to the target BS to request switching the mobile terminal that the source BS serves to the target BS;

A handoff response module 804, used to make the target BS send the handoff response message to the source BS, and the source BS forwards the content of the handoff response message to the mobile terminal in a handoff command message, wherein the handoff command message does not include reserved character codes, and the reserved character code is a part of the random access character codes separately allocated to the handoff access mobile terminal;

A sub-channel selection module 806, used to make the mobile terminal determine that the handoff command message does not include the reserved character code after the handoff command message is received and then select the random access sub-channel; and A random access module 808, used to make the target BS and the mobile terminal initiate the handoff access procedure on the random access sub-channel.

Alternatively, the handoff response module 804 is used to make the target BS exclude the reserved character code from the handoff response message if there is no free reserved character code.

Alternatively, the handoff response module 804 is used to make the target BS exclude the reserved character code from the handoff response message if the mobile terminal is out of uplink synchronization before handoff.

Alternatively, the sub-channel selecting module 806 is used to make the mobile terminal select a random access sub-channel having no reserved character code.

Alternatively, the sub-channel selecting module 806 is used to make the mobile terminal select a non-reserved character code and then select the random access sub-channel that the non-reserved character code is located in if the selected random access sub-channel has reserved the reserved character code, wherein the non-reserved character code is a residual random access character code.

Alternatively, information of the non-reserved character code is obtained from system message.

Alternatively, information of the non-reserved character code is obtained from the handoff command message.

Alternatively, the random access module 808 comprises: a random access response module (not shown), which is used to make the target BS send a random access response message to the mobile terminal, wherein the message contains uplink synchronous information and uplink wireless channel resource information; and a handoff complete module (not shown), which is used to make the mobile terminal send a handoff complete message to the target BS after the random access response message is received.

Alternatively, the handoff response module 808 is used to make the target BS contain a temporary ID number that allocated to the mobile terminal in the handoff command message, wherein the handoff complete message comprises the temporary ID number for further collision resolution mechanism.

Now, the embodiments according to the present invention will be described in detail.

The wireless access network of cellular mobile communication system according to the present invention employs the following methods to discriminate handoff access and other random access:

1, the reserved character code is a part of the random access character codes allocated to the handoff access mobile terminal separately in advance; and 2, all the character codes except for character code which is reserved in advance can be selected by the terminal freely with the precondition that the wireless access network did not allocate any reserved character code for these terminals; and the remaining (residual) character codes are referred to as non-reserved character codes; and 3, the character code per se in the random access message shows the access reasons cryptically, that is to say, if the character code in a certain random access message is the reserved character code, then the handoff reason is handoff access.

If there is a plurality of random access sub-channels in a cell, then the character code can be reserved on the plurality of random access sub-channels. The random access sub-channel that the reserved character code is located in should be specified when the reserved character code is allocated to a certain accessed terminal, so as to prevent the terminals allocated with an identical reserved character code from being accessed on the same random access sub-channel, and otherwise collision will occur. The information of the character code reserved on one or more random access sub-channels is referred to as reserved information of the character code.

Figure 1:
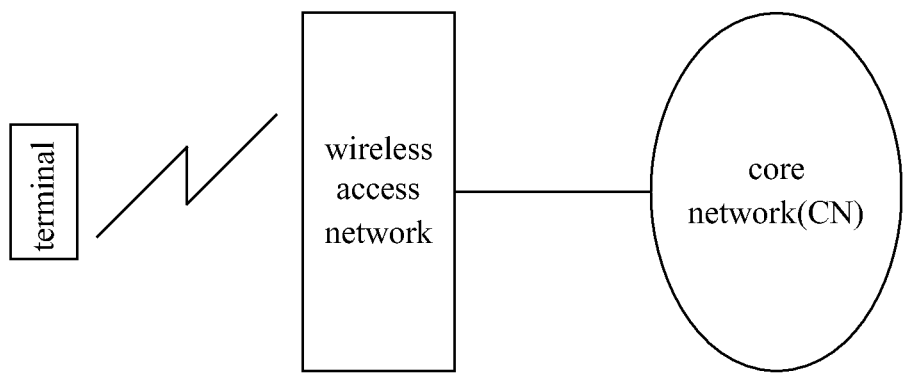
FIG. 1 is a structure view of a cellular wireless communication system.
Figure 2:
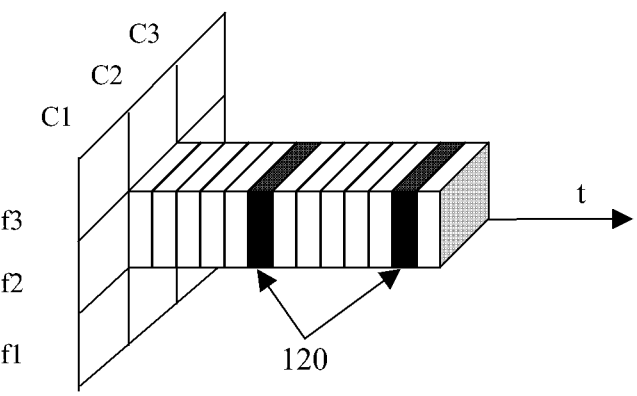
FIG. 2 is a schematic view of a random access sub-channel and a time slot.
Figure 3:
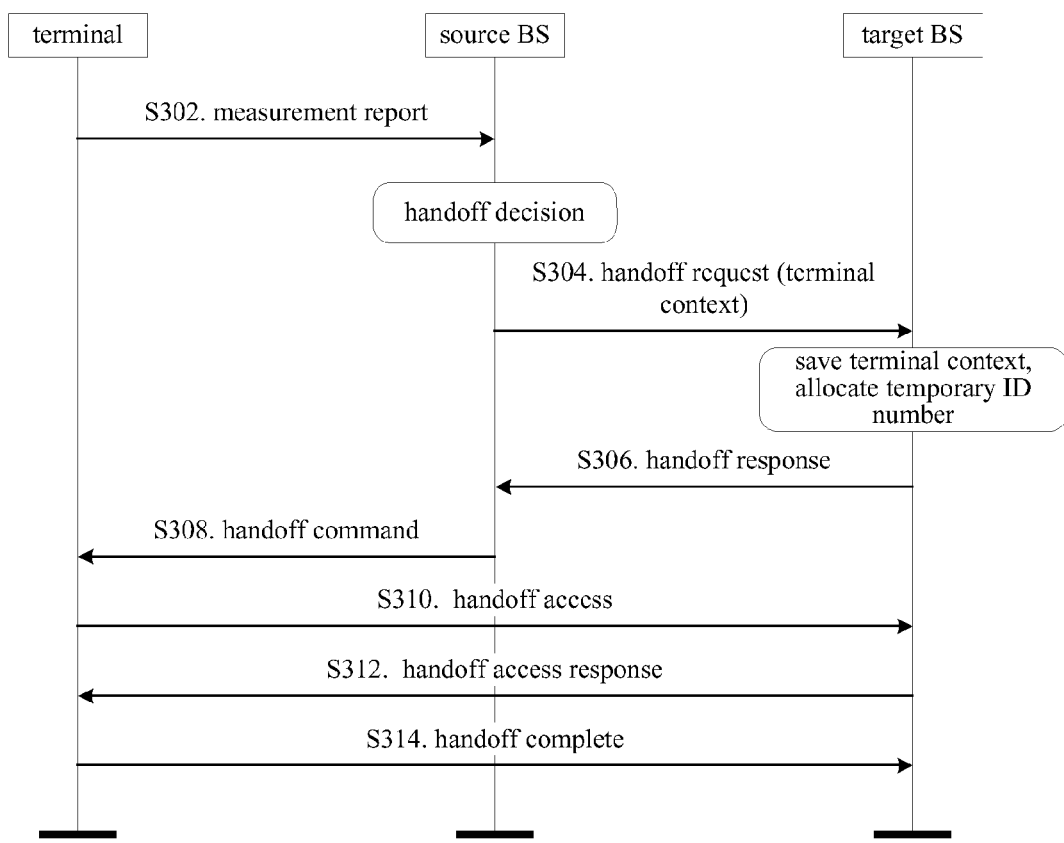
FIG. 3 is a flowchart of the handoff procedure of a cellular wireless communication system not using reserved character code according to one embodiment of the present invention.

FIG. 3 is a handoff flowchart of a cellular mobile communication system, and in the handoff procedure, the target BS, for a certain reason, does not allocate any reserved character code after receiving a handoff request, and the handoff process comprises:

Step 302, a terminal sends a measurement report to the source BS in service, which comprises the measurement information about adjacent cells. After analyzing the measurement report sent by the terminal, the source BS determines whether to switch the terminal out of its coverage area in connection with the wireless resource management information configured, and then selects one target BS for handoff if it is determined to do switch;

Step 304, the source BS sends a handoff request message to the target BS, and the request message contains the terminal context saved at the source BS;

Step 306, after saving the context, the target BS allocates a temporary ID number to the terminal. The target BS, for certain reasons, determines not to allocate reserved character code. The handoff response message to the source BS contains the temporary ID number of the terminal, but no reserved character code is contained;

Step 308, the source BS forwards information in the received handoff response message, that is, the handoff command message at the wireless interface contains the temporary ID number, but no reserved character code is contained;

Step 310, after receiving the handoff command message, the terminal finds that the network did not allocated reserved character code, then the terminal selects a random access sub-channel without any reserved character code and initiates a random access process; or the terminal selects a character code from the non-reserved character codes, and then sends a random access message on the random access sub-channel that the character code is located in;

Step 312, after receiving the random access message, the target BS finds that the character code utilized in the message is not a reserved character code, and deems that a random access message is received. Then the target BS sends a random access response message to the terminal, wherein the random access response message contains information such as uplink synchronous information and uplink wireless channel resources; and Step 314, after receiving the random access response message, the terminal sends a handoff complete message to the target BS, the message comprising the temporary ID number allocated by the target BS, for further collision resolution mechanism. Wherein, the terminal selects a non-reserved character code or a random sub-channel without a reserved character code, that is, in the view of the BS, the reserved character code is not adopted, so the following process is similar to the random access process; if the reserved character code is adopted, the following process will be different from the random access process.

What should be reminded is that, there is no difference between the handoff access message and the random access message in form, different names are adopted due to the different initiation reasons on the random access sub-channel; however, the handoff access response message and the random access response message may be different from each other.

Figure 4:
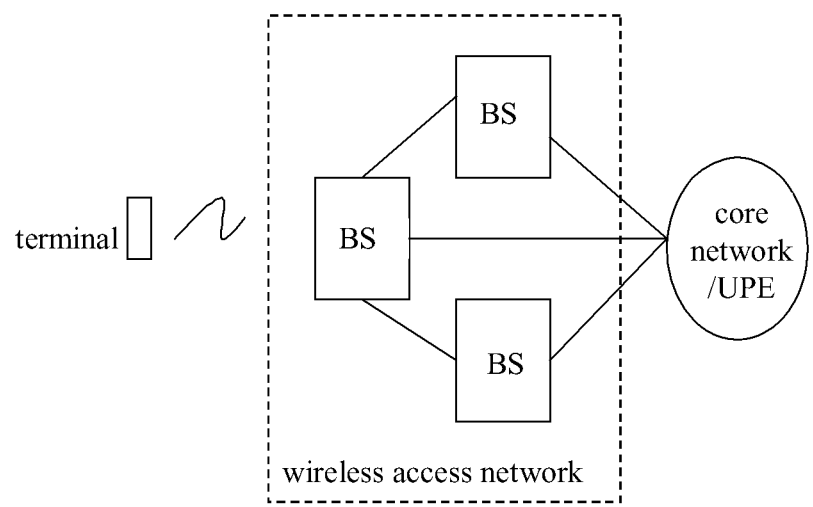
FIG. 4 is a schematic view of the structure of a LTE system.

The LTE system currently discussed in the field is a typical cellular wireless communication system. As shown in FIG. 4, the system consists of terminals, BSs and a core network, that whether there is logical or even physical connection between BSs depends on mobility management requirement of the network. All the BSs connecting with the core network constitute a wireless access network, the uplink/downlink wireless resource management thereof is based on the idea of channel share, and scheduled by the BSs.

Figure 5:
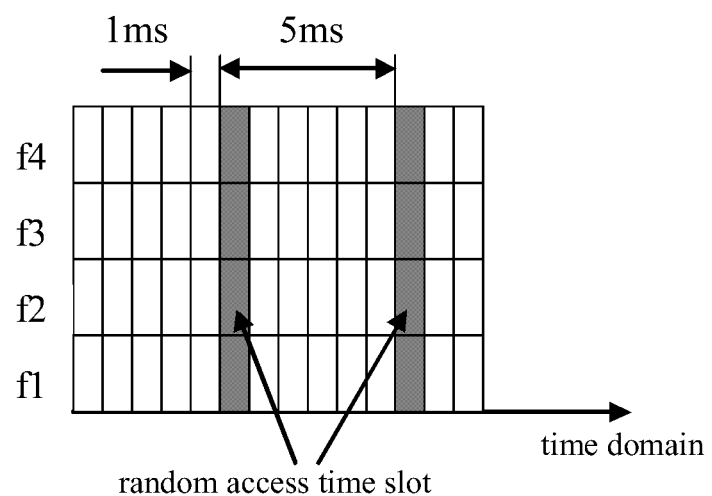
FIG. 5 is a schematic view of a random access sub-channel and a time slot of the LTE system.

In the LTE system, channels are configured in frequency domain, and as shown in FIG. 5, 4 frequency bands forms 4 channels. The frame for random access on a channel is referred to as random access time slot, and on a channel, the random access time slots with fixed intervals form random access sub-channel. During initial access, uplink synchronization, or handoff among BSs, the terminal sends random access message on the uplink random access sub-channel, and the information bit loaded in the message is expressed by the sequence number of a character code with high self-correlation.

Embodiment

The Handoff Process without Reserving Character Codes

In this embodiment, there are 2 random access sub-channels in Cell 1 of the target BS, and each random sub-channel have 64 character codes, among which, character codes No. 40-63 are reserved.

Figure 6:
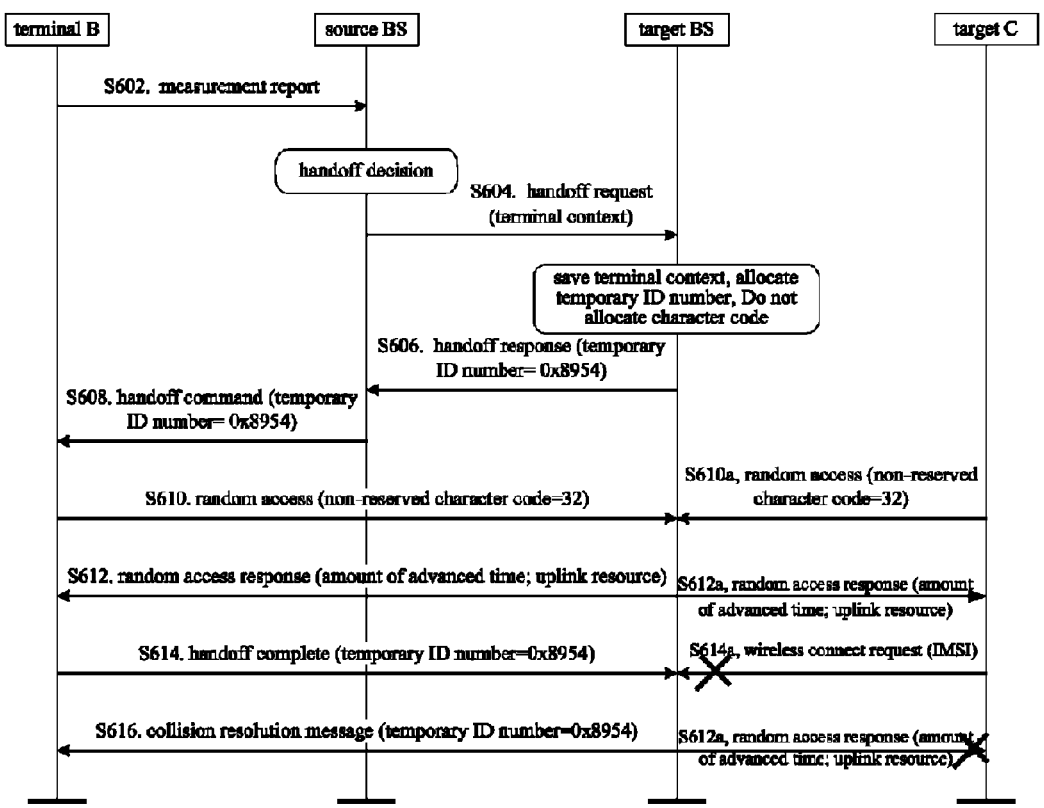
FIG. 6 is a flowchart of the handoff procedure of the LTE system not using a reserved character code according to one embodiment of the present invention.

As shown in FIG. 6, the handoff procedure comprises the following steps:

Step 602, based on the measurement control information sent by the BS, the terminal B measures adjacent cells and sends the measurement result to the serving BS, i.e. the source BS, via the measurement report.

Step 604, the source BS determines to switch the terminal B to Cell 1 of the target BS, and sends a handoff request message to the target BS, and the message includes context information of the source BS.

Step 606, the target BS allocates a 16-bit temporary ID number with a value of 0x8954 to the terminal B; the target BS determines not to allocate the reserved character code to the terminal B due to certain reasons, for example, it finds that all the reserved character codes have been allocated. Then the target BS sends a handoff response message, comprising the temporary ID number of the terminal B, information of the second random access sub-channel and reservation information of the character code on the sub-channel, for example, the sequence number 39 of the maximum non-reserved character code indicates that character codes from No. 0 to No. 39 are non-reserved character codes.

Step 608, the source BS sends to the terminal B the information below via a handoff command at a wireless interface: temporary ID number, the information of the second random access sub-channel of Cell 1, the sequence number 39 of the maximum non-reserved character code, and other description information relating to the target BS, which are received from the handoff response message.

Step 610, after receiving the handoff command message, the terminal B sends a handoff access message on the second random access sub-channel of Cell 1 of the target BS, and the non-reserved character code with a sequence number of 32 is compiled into the message; meanwhile, the terminal C also sends a random access message at the same time slot of the same random sub-channel, and the random access message comprises the character code with a sequence number of 32.

Step 612, based on the sequence number of the received character code, the target BS deems that only one terminal is initiating random access, and meanwhile, as the target BS can not determine the ID of the terminal, it sends a downlink random access response message, wherein the message comprises synchronous information and uplink channel resource information, etc. Both the terminal B and the terminal C will receive the random access response message.

Step 614, both the terminal B and the terminal C deem that the target BS receives its random access, and thus respectively send a Layer 3 message as follows: the terminal B will send a handoff complete message, comprising its temporary ID number 0x8954, while the terminal C will send a wireless connect request message, which may comprise its permanent ID number IMSI (International Mobile Subscriber Identity). As the uplink resources for the two terminals to send the message come from the same random access response message, the target BS will receive two messages at the same time. Suppose the signal strength of the terminal B is higher than that of the terminal C, the target BS can only correctly decode the handoff complete message, while the signal of the wireless connect request message of the terminal C is discarded as interference.

Step 616, after correctly decoding the handoff complete message, the target BS immediately sends a collision resolution message, wherein the collision resolution message comprises the temporary ID number 0x8954 of the terminal B. As for the terminal B, it can confirm that execution of handoff has been completed; as for the terminal C, it finds that the message received is the one should be sent to other terminals, and thus the terminal C detects that the random access procedure fails, and then initiates the random access again or gives up the procedure.

It is apparent that the present invention can realize the following technological effects from the above description:

The method and the device according to the present invention can prevent the terminal requesting handoff access at any time at a wireless interface from being refused as no reserved character code is allocated, and thus the terminal continues to obtain wireless channel resources of the target BS on the random access sub-channel in the manner of random access.

Obviously, one skilled in the art shall understand that various modules and steps above can be realized with general computing devices and can be integrated into one single computing device or distributed within a network consisting of multiple computing devices, and alternatively, the various modules and steps above can be realized with the program codes executable by the computing devices, and thus these program codes can be stored in memory devices so as to be executed by the computing devices, or the various modules and steps above can be formed into individual integrated circuit modules, or a plurality of the modules or steps can be formed into a single integrated circuit module so as to be realized. Therefore, the present invention is not limited to any particular hardware or software combination. It should be understood that alterations of the embodiments are apparent to one skilled in the art and do not depart from the scope and spirit of the present invention.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

The invention claimed is:

1. A handoff access method based on a random access channel for handoff access of a mobile terminal of a cellular mobile communication system, the method comprising:
    sending a handoff request message to a target Base Station (BS) by a source BS, the handoff request message being used to request switching a mobile terminal that the source BS serves to the target BS;
    sending a handoff response message to the source BS by the target BS, then forwarding, a handoff command message with content of the handoff response message to the mobile terminal by the source BS, wherein the handoff command message does not include a reserved character code, and the reserved character code is one of a first part of random access character codes separately allocated to the mobile terminal and other mobile terminals in advance;
    after receiving the handoff command message by the mobile terminal, based on a determination that the handoff command message excludes the reserved character code, selecting a random access sub-channel;
    based on a determination by the mobile terminal that the reserved character code is reserved on the selected random access sub-channel, the mobile terminal selecting a non-reserved character code and then selecting the random access sub-channel that the non-reserved character code is located in, wherein the non-reserved character code is a random access character code selected from a remaining part of the random access character codes; and
    initiating a handoff access procedure on the random access sub-channel by the mobile terminal.

2. The method of claim 1, wherein the sending the handoff response message further comprises the target BS not containing the reserved character code in the handoff response message if there are no free reserved character codes.

3. The method of claim 1, wherein the sending the handoff response message further comprises the target BS not containing, the reserved character code in the handoff response message if the mobile terminal is out of uplink synchronization before handoff.

4. The method of claim 1, wherein the determining further comprises selecting a random access sub-channel having no reserved character code by the mobile terminal.

5. The method of claim 4, wherein information of the non-reserved character code is obtained from a system message.

6. The method of claim 4, wherein information of the non-reserved character code is obtained from the handoff command message.

7. The method of claim 1, wherein the initiating further comprises:
    sending a random access response message to the mobile terminal by the target BS, wherein the random access response message contains uplink synchronous information and uplink wireless channel resource information; and after receiving the random access response message, sending a handoff complete message to the target BS by the mobile terminal.

8. The method of claim 7, wherein the sending the handoff response message further comprises containing by the target BS in the handoff command message a temporary ID number allocated by the target BS to the mobile terminal in response to the handoff request message from the source BS to the target BS and the temporary ID number is then forwarded to the mobile terminal in the handoff command message, wherein the handoff complete message includes the temporary ID number for a further collision resolution mechanism such that a handoff complete message from another mobile terminal that does not include the temporary ID number cannot complete the handover to the target BS successfully.

9. A handoff access device based on a random access channel, for handoff access of a mobile terminal, in a cellular mobile communication system, comprising:

a handoff request module, enabled to make a source BS send a handoff request message to a target ES to request switching a mobile terminal that the source ES serves to the target BS;

a handoff response module, enabled to make the target BS send a handoff response message to the source ES, and the source BS transmit content of the handoff response message contained in a handoff command message to the mobile terminal, wherein the handoff command message does not include a reserved character code, and the reserved character code is one of a first part of random access character codes separately allocated to the mobile terminal and other mobile terminals in advance;

a sub-channel selecting module, based on a determination that the handoff command message excludes the reserved character code, enabled to make the mobile terminal select a random access sub-channel after the handoff command message is received, wherein, based on a determination by the mobile terminal that the reserved character code is reserved on the selected random access sub-channel, the mobile terminal then select a non-reserved character code and select the random access sub-channel that the non-reserved character code is located in, wherein the non-reserved character code is a random access character code selected from a remaining part of the random access character codes; and a handoff access module, enabled to make the target BS and the mobile terminal initiate a handoff access procedure on the random access sub-channel.

10. The device of claim 9, wherein the handoff response message does not contain the reserved character code if there are no free reserved character codes.

11. The device of claim 9, wherein the handoff response message does not contain the reserved character code if the mobile terminal is out of uplink synchronization before handoff.

12. The device of claim 9, wherein the handoff command message contains a temporary ID number allocated by the target BS to the mobile terminal in response to the handoff request message from the source BS to the target BS and the temporary ID number is then forwarded to the mobile terminal in the handoff command message, and a handoff complete message includes the temporary ID number for a further collision resolution mechanism such that a handoff complete message from another mobile terminal that does not include the temporary ID number cannot complete the handover to the target BS successfully.

13. A system comprising:

a target Base Station (BS), a source BS, and a mobile terminal, wherein the target BS, the source 135, and the mobile terminal are of a cellular mobile communication system;

means for sending a handoff request message to the target BS, the handoff request message being usable to request switching the mobile terminal from being served by the source BS to being served by the target BS;

means for sending a handoff response message to the source BS, then forwarding a handoff command message with content of the handoff response message to the mobile terminal, wherein the handoff command message does not include a reserved character code, and the reserved character code is a one of a first part of random access character codes separately allocated to the mobile terminal and other mobile terminals in advance;

means for after receiving the handoff command message by the mobile terminal, based on a determination that, the handoff command message excludes the reserved character code, selecting a random access sub-channel, wherein, based on a determination by the mobile terminal that the reserved character code is reserved on the selected random access sub-channel, the mobile terminal selecting a non, reserved character code and then selecting the random access sub-channel that the non-reserved character code is located in, wherein the non-reserved character code is a random access character code selected from remaining part of the random access character codes; and means for initiating a handoff access procedure on the random access sub-channel.

14. The system of claim 13, wherein the source BS comprises the means for sending the handoff request message.

15. The system of claim 13, wherein the target BS comprises the means for sending the handoff response message.

16. The system of claim 13, wherein the mobile terminal comprises the means for initiating the handoff access procedure.

17. The system of claim 13, wherein the handoff response message does not contain the reserved character code if there are no free reserved character codes.

18. The system of claim 13, wherein the handoff response message does not contain the reserved character code if the mobile terminal is out of uplink synchronization before handoff.

19. The system of claim 13, wherein the selected random access sub-channel has no reserved character code.

* * * * *